(12) United States Patent
Cleveland et al.

(10) Patent No.: US 9,280,832 B2
(45) Date of Patent: Mar. 8, 2016

(54) METHODS, SYSTEMS, AND COMPUTER READABLE MEDIA FOR VISUAL ODOMETRY USING RIGID STRUCTURES IDENTIFIED BY ANTIPODAL TRANSFORM

(71) Applicant: The Trustees of the University of Pennsylvania, Philadelphia, PA (US)

(72) Inventors: Jonas Cleveland, Plainfield, NJ (US); Kostas Daniilidis, Wynnewood, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 14/707,632

(22) Filed: May 8, 2015

(65) Prior Publication Data

US 2015/0325003 A1    Nov. 12, 2015

Related U.S. Application Data

(60) Provisional application No. 61/990,478, filed on May 8, 2014.

(51) Int. Cl.
*G06T 7/20* (2006.01)
*G06T 7/00* (2006.01)
*H04N 5/225* (2006.01)
*G06K 9/00* (2006.01)

(52) U.S. Cl.
CPC ............ *G06T 7/2033* (2013.01); *G06T 7/0042* (2013.01); *G06T 2207/10016* (2013.01)

(58) Field of Classification Search
CPC .................. G06T 2207/10016; G06T 7/0071; G06T 7/2046; G06K 2209/40; G06K 9/20
See application file for complete search history.

(56) References Cited

U.S. PATENT DOCUMENTS

| | | | | |
|---|---|---|---|---|
| 2007/0288141 | A1* | 12/2007 | Bergen | G01C 21/005 701/38 |
| 2012/0219188 | A1* | 8/2012 | Kurz | G06K 9/3216 382/103 |

OTHER PUBLICATIONS

Lim et al ("Estimation of the epipole using optical flow at antipodal points", Computer Vision and Image Understanding, 2009 Elsevier, pp. 245-253).*
Bazian et al (UAV Attitude Estimation by Vanishing Points in Catadioptric Images, International Conference on Robotics and Automation, IEEE 2008, pp. 2743-2748).*
Byrne et al., "Nested Shape Descriptors," International Conference on Computer Vision (ICCV'13), pp. 1-8 (2013).
Scaramuzza et al., "Visual Odometry Part I: The First 30 Years and Fundamentals," IEEE Robotics & Automation Magazine, pp. 80-92 (Dec. 2011).

(Continued)

*Primary Examiner* — Amara Abdi
(74) *Attorney, Agent, or Firm* — Jenkins, Wilson, Taylor & Hunt, P.A.

(57) ABSTRACT

The subject matter described herein includes methods for visual odometry using rigid structures identified by an antipodal transform. One exemplary method includes receiving a sequence of images captured by a camera. The method further includes identifying rigid structures in the images using an antipodal transform. The method further includes identifying correspondence between rigid structures in different image frames. The method further includes estimating motion of the camera based on motion of corresponding rigid structures among the different image frames.

23 Claims, 13 Drawing Sheets

(56) References Cited

OTHER PUBLICATIONS

Alshawa, "ICL: Iterative closest line a novel point cloud registration algorithm based on linear features," Ekscentar, No. 10, pp. 53-59 (2007).

Nistér et al., "Visual Odometry," Proceedings of the 2004 IEEE Computer Society Conference on Computer Vision and Pattern Recognition, CVPR 2004, vol. 1. IEEE, pp. 1-8 (2004).

Felzenszwalb et al., "Distance Transforms of Sampled Functions," Cornell University, pp. 1-15 (2004).

Rusinkiewicz et al., "Efficient Variants of the ICP Algorithm," Third International Conference on 3-D Digital Imaging and Modeling, IEEE, pp. 1-8 (2001).

Triggs et al, "Bundle Adjustment—A Modern Synthesis," Vision Algorithms: Theory and Practice, pp. 298-372 (2000).

Longuet-Higgins, "A computer algorithm for reconstructing a scene from two projections," Readings in Computer Vision: Issues, Problems, Principles, and Paradigms, Nature vol. 293, pp. 133-135 (Sep. 10, 1981).

Moré, "The Levenberg-Marquardt Algorithm: Implementation and Theory," Numerical Analysis, Springer Berlin Heidelberg, pp. 105-116 (1978).

Hu at al., "A Sliding-Window Visual-IMU Odometer Based on Trifocal Tensor Geometry," IEEE International Conference on Robotics & Automation (ICRA), pp. 3963-3968 (May 31-Jun. 7, 2014).

* cited by examiner vertScore = |V1-V2|
horizScore = |H1-H2| distScore(i) = -(vertScore+horizScore);

METHODS, SYSTEMS, AND COMPUTER READABLE MEDIA FOR VISUAL ODOMETRY USING RIGID STRUCTURES IDENTIFIED BY ANTIPODAL TRANSFORM

PRIORITY CLAIM

This application claims the benefit of U.S. Provisional Patent Application Ser. No. 61/990,478 filed May 8, 2014; the disclosure of which is incorporated herein by reference in its entirety.

GOVERNMENT INTEREST

This invention was made with government support under Grant No. 0835714 awarded by the National Science Foundation. The government has certain rights in the invention.

TECHNICAL FIELD

The subject matter described herein relates to visual odometry. More particularly, the subject matter described herein relates to methods, systems and computer readable media for visual odometry using rigid structures identified by antipodal transform.

BACKGROUND

Visual odometry refers to the estimation of the path of a camera from solely from video images taken by the camera. The term "visual odometry" was created by Nister due to its similarity to wheel odometry. Wheel odometry estimates the distance traveled by a vehicle based on rotations of the vehicle's wheels. Visual odometry estimates motion, not only the distance traveled, but also the path or trajectory (X, Y, Z) coordinates and camera orientation at each point), traveled by a camera based on analysis of images captured by a camera in successive video frames. Such a path or trajectory can be used to re-trace the path of the camera or the object to which the camera is attached. Applications of video odometry include robotics, location services, turn-by-turn navigation, and augmented reality. For example, if GPS communications are not available, visual odometry can provide a trajectory to be followed if it is desirable to retrace a path.

Existing visual odometry algorithms rely on a triangulation step in order to reconstruct tracked features. The reconstructed features are then tracked between video sequences in order to maintain a uniform scale of camera trajectory. Reconstructing tracked features using triangulation for each frame is computationally intensive. Accordingly, there exists a need for improved methods for visual odometry that avoids or reduces the need for triangulation for each frame and is less computationally intensive than existing visual odometry methods.

SUMMARY

The subject matter described herein includes methods for visual odometry using rigid structures identified by an antipodal transform. The method further includes identifying correspondence between rigid structures in different image frames. One exemplary method includes receiving a sequence of images captured by a camera. The method further includes identifying rigid structures in the images using an antipodal transform. The method further includes estimating motion of the camera based on motion of corresponding rigid structures among the different image frames.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1A:
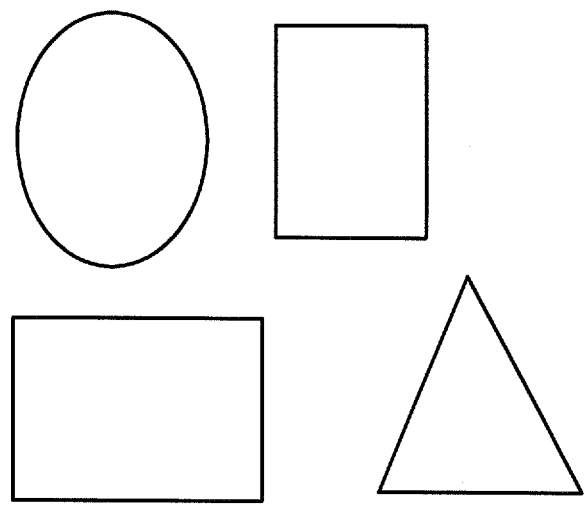
FIG. 1A is a diagram illustrating simple geometric shapes and FIG. 1B is a diagram using color to show the antipodal transforms of the shapes illustrated in FIG. 1A. Darker shaded regions represent the maxima of the transform scores associated with keypoints. Lighter regions represent the minima of the transform scores.

The subject matter described herein includes methods, systems, and computer readable media for visual odometry using rigid structures identified by antipodal transform. Rather than using a triangulation step to reconstruct tracked features in each frame to maintain a uniform scale of camera trajectory, the subject matter described herein records the scale of tracked features to determine translation of the camera. An exemplary process for visual odometry using rigid structures identified by antipodal transforms will now be described.

As stated above, visual odometry is the estimation of the trajectory of motion of a camera using video as input. This trajectory is with respect to an initial coordinate system and can be visualized as a path of (X, Y, Z) coordinates in space.

The subject matter described herein includes a new approach for the computation of visual odometry based on a hybrid system using both points and line segments detected and tracked in images of the video. The present approach encompasses the following steps:
 1. A new mathematical transform referred to as the antipodal transform is used to identify rigid structures in an edge image of a scene. A method for fast computation of the antipodal transform is also described. The antipodal transform is used herein to identify unoccupied points at the center of rigid structures in image data. The term "antipodal" in mathematics means on the diametrically opposite side of a circle or sphere. However, the term "antipodal transform" as used herein refers to a transform used to identify the center point of any rigid structure in an image and is not limited to circular or spherical structures.
 2. The rigid structures that are identified are structures that do not change from scene to scene, such as architectural features like doors, windows, walls, frames, furniture, or other fixed structures that do not change from scene to scene, such as architectural features like doors, windows, walls, frames, furniture, or other fixed, immobile objects in a scene. The reason for identifying such structures is that motion of these structures between image frames indicates movement of the camera, rather than movement of the corresponding structures. The following section describes the antipodal transform and a method for its fast computation.

Antipodal Transform

The antipodal transform is closely related to the Distance Transform in that it applies a score to binary matrix elements based on their relationship to the closest occupied element and occupancy matrices, where this some distinct range of scores for all elements. The subject matter described herein used the antipodal transform to identify rigid structures in image data, where a rigid structure is a structure, such as doors, windows, walls, frames, furniture, or other fixed structures that do not change from scene to scene, that is not likely to change from one image frame to the next. Maxima and minima of the transform are used to find key points of interest in a scene, where key points will be tracked between frames. The antipodal transform biases pixels corresponding with rigid physical structures in the scene environment.

There are a number of other applications for the antipodal transform. In digital image processing the transform can be used to determine blurring effects and also for skeletonizing.

The transform signature itself as well as structural correspondence between key points in a scene can be used in object detection. In robotics, where a matrix may correspond to a map where values correspond to the level or obstacles in the terrain, the transform may be applied in motion planning or path finding.

In contour analysis and segmentation, a gradient contour is often discovered by tracing an edge until a loop closure. The centroid of the contour can then be found by taking the mean of the positions of the boundary pixels. However, the antipodal transform directly computes the position of the center of gradient contours. Further, contours can be extracted by taking the region around an Antipodal Transform maxima and minima.

The Antipodal Transform (AT) can be expressed as $$AT(p) = \sum_{\sigma=0}^{2\pi} \min(d(p, f(p + t\eta)))\vec{\eta}, n = \begin{pmatrix} \cos\theta \\ \sin\theta \end{pmatrix},$$

where f is a function that returns a value based on the occupancy of values along the vector $\vec{\eta}$. The examples shown herein use a function f that returns the coordinates of occupied elements. In the formula, p is a point in the image being tested. The function d( ) measures the distance between the point p and the nearest occupied point p+δ*η. The term δ can hold values 0 or 1 depending on the occupancy of the point in the matrix.

Figure 1B:
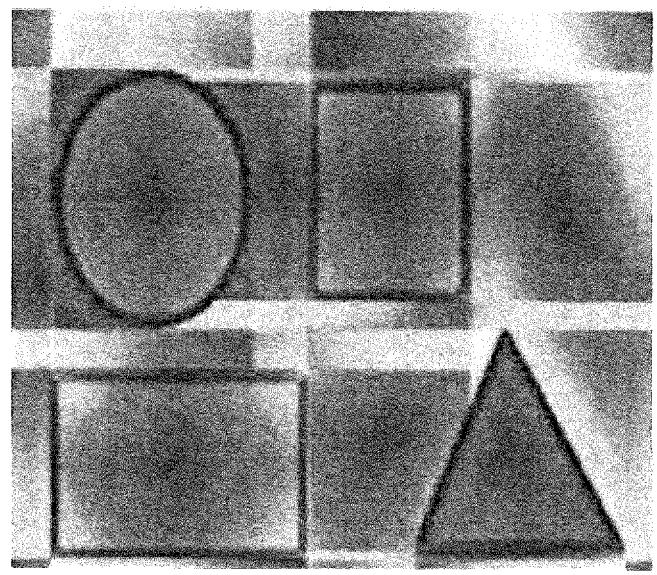

As stated above, the antipodal transform is similar to the distance transform. In the distance transform, given a binary matrix, the score of each point is its distance to the nearest occupied element in the matrix. The antipodal transform can also be expressed as a computation over an occupancy matrix. Each point is given a score dependent on the distance of the closest occupied element in one particular direction minus the distance of the closest element in the opposite direction The antipodal transform is defined, for a given point, as the sum of all distances of the closest point in a particular direction minus the point closest point in the opposite direction for all directions. In our fast computation approach, we apply this summation solely along the vertical and horizontal directions in order to increase computation speed. See examples below:

FIGS. 1A and 1B illustrate the antipodal transform computed in the four primary directions for some simple shapes. More particularly, FIG. 1A illustrates basic geometric shapes and FIG. 1B utilizes color to illustrate the antipodal transform computed in four directions for each of the shapes. In FIG. 1B, red is the highest value and blue is the lowest value. It can be seen from FIG. 1B that the sides of each of the geometric shapes are outlined with darker shading, indicating high scores. In an image frame, such regular geometric shapes would represent rigid structures, such as a fixed object, that can be used to determine camera rotation and motion from one frame to the next.

Figure 2A:
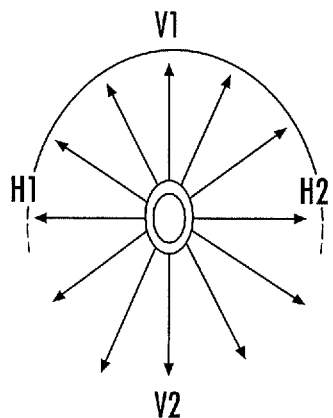
FIG. 2A illustrates different directions for computation of the antipodal transform and FIG. 2B illustrates computation of the antipodal transform in horizontal and vertical directions for different irregular shaped objects.
Figure 2B:
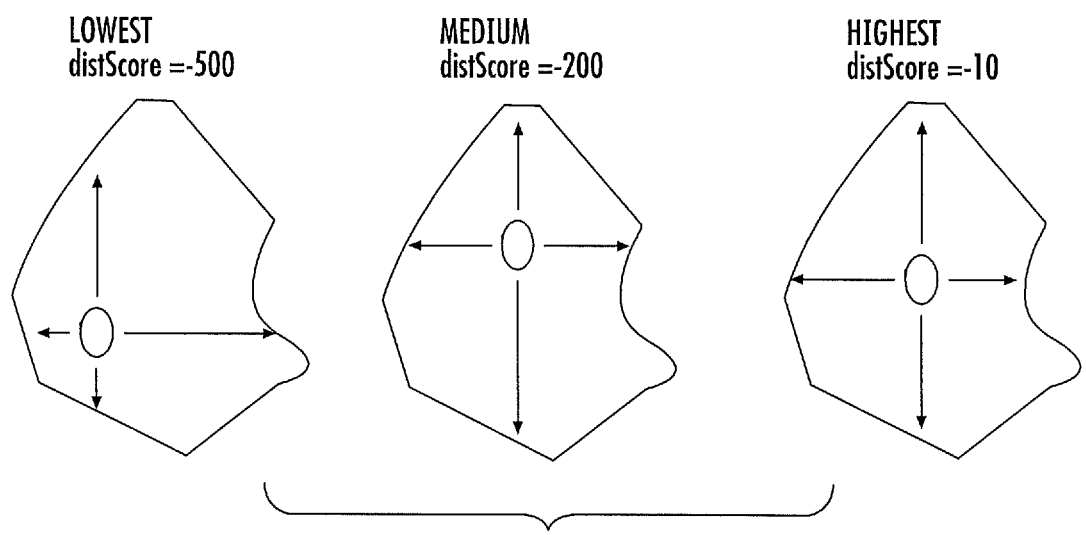

FIG. 2A illustrates different directions for computation of the antipodal transform, and FIG. 2B illustrates computation of the antipodal transform in horizontal and vertical directions for different irregular shaped objects. In FIGS. 2A and 2B, V1, V2, H1, and H2 represent the value of the antipodal transform in vertical and horizontal directions from a given point within a structure. The final score is the negative of the sum of the horizontal and vertical scores. Depending on the application the values of the transform can be negated or initialized at different limits. The example in FIG. 2B illustrates scores for different points within a structure.

Figure 3A:
FIG. 3A illustrates an example of an image of a scene captured by a camera.
Figure 3B:
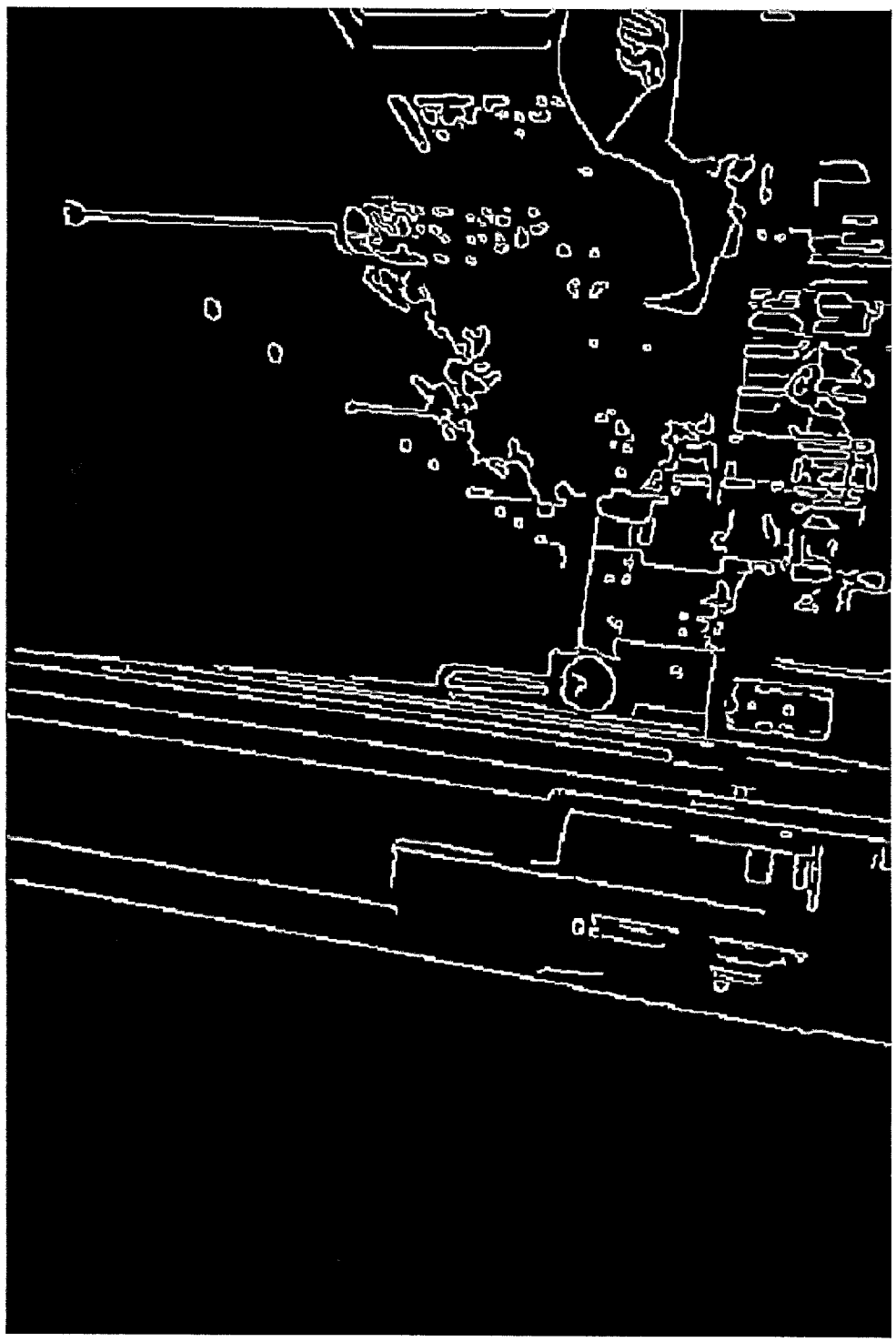
FIG. 3B illustrates an intermediate image where the edges are shown in white.
Figure 3C:
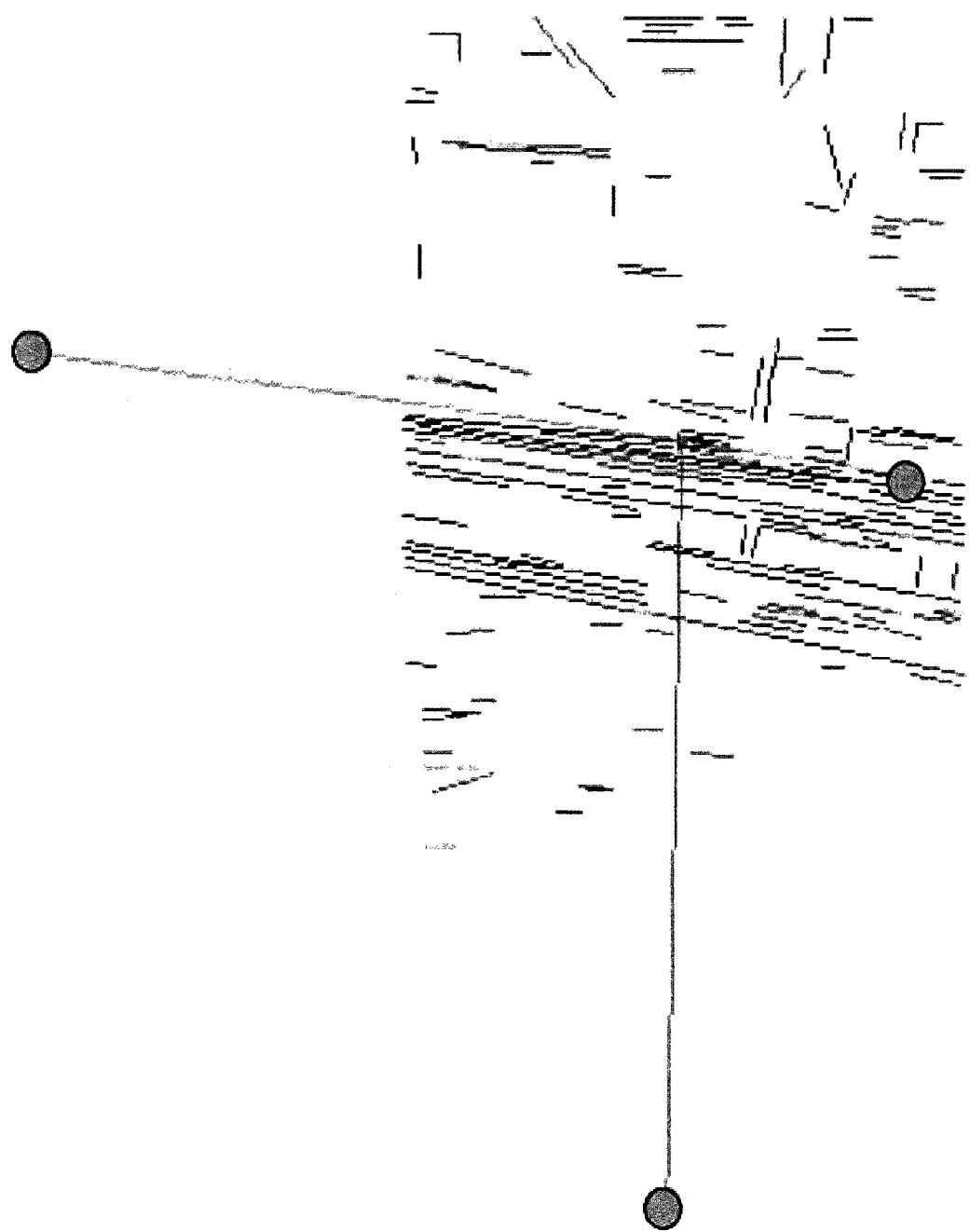
FIG. 3C illustrates the corresponding edge image where the edges are shown in black and everything that is not an edge is shown in white.

The following steps outline a method for fast computation of the antipodal transform:

a. A Fast Method for Computing the Antipodal Transform:
i. Create a binary matrix. In this case we have the binary edge image from the scene. An edge image can be generated from a video frame captured by a camera whose motion is being tracked. FIG. 3A illustrates an example of an image of a scene captured by a camera, FIG. 3B illustrates an intermediate image where the edges are shown in white, and FIG. 3C illustrates the corresponding edge image where the edges are shown in black and everything that is not an edge is shown in white. The binary matrix is a two-dimensional matrix where each matrix element corresponds to a pixel or group of pixels in the edge image. Thus, the binary matrix for the edge image in FIG. 3C may includes a 1 or high value for pixels corresponding to edges and a 0 or low value for pixels corresponding to space that is not an edge.
ii. Given a binary matrix, reshape the matrix to one-dimension (or traverse the matrix such that it is linear), where elements are organized according to the direction in which they are being evaluated. For instance when evaluating the score along the horizontal direction, the matrix traversal should be organized such that all rows of the matrix are horizontally concatenated to form a linear vector.
iii. Mark occupied elements to have the highest score or infinity. Each matrix element is assigned a score or value depending on whether or not the corresponding pixel in the edge image is occupied by an edge or unoccupied. Thus, in a binary matrix for an edge image of a scene, matrix elements corresponding to edges are set to the highest score, and matrix elements between edges are set to zero or the lowest score
iv. In spaces with no occupancy, find the length of the space and the midpoint of the space. Apply a score to each element determined by the y value of a parabola centered at the mid-point of the vacant occupancy space, where x is the position of the element in the vacant space. The general formula for this parabola is $y=x^2$. Thus, if the space is a rectangle, points near the center will have lower scores and points near the edges will have higher scores.
v. Find the score for each element over all directions being evaluated. Sum the scores in each direction for all elements. Continuing with the rectangle example, scores for each point enclosed by the rectangle would have a score for the horizontal and vertical directions. The horizontal and vertical score for each point is summed to create a total (horizontal plus vertical) score for each point.

3. Keypoints in the scene are identified using the antipodal transforms. The keypoint is a point at the center of a rigid structure. In the calculation of the antipodal transform, midpoints of unoccupied spaces are often identified. However, some of the midpoints may be inside of rigid structures whose motion is desired to be tracked between frames, and some midpoints are within structures and thus candidates for keypoints. The following method illustrates how to locate keypoints.

a. Apply a suppression algorithm when computing the score for unoccupied spaces during the antipodal transform calculation such that higher values are applied when the length between the point and an occupied cell is below a determined threshold. The purpose of this step is to eliminate points that are outside of rigid structures, such as spaces between rigid structures.
b. Extract points with the highest antipodal transform.

The following section explains the keypoint search in more detail.

Keypoint Search

The antipodal transform is ideal for finding rigid structures in a scene. Rigid structures are often symmetric along at least one axis.

Given the antipodal transform formula set forth above in the equation for the antipodal transform AT(p), the absolute value of the expression is negated. Thus, the highest possible value will be 0. Keypoints will be points where the antipodal transform score is highest. Given the nature of the antipodal transform, keypoints will correspond to the centers of rigid structures in the scene. In a binary edge image, there are some cases when multiple lines will be found that only correspond to one edge on a structure. However, the region between the lines can be symmetrical along two different axis and thus a maxima. In order to eliminate these maxima we employ a form of suppression. When computing the transform, only vacant areas in the linear vector (see Fast Method for Computing the Antipodal Transform above) longer than a certain threshold are given a score. Areas shorter than the threshold are given the same score as occupied values in the matrix.

4. Once the keypoints are identified, a new image descriptor is defined and applied at keypoints in the image. The new image descriptor can be used to group edge lines in a scene. The purpose of defining an image descriptor for each keypoint is to identify correspondences between keypoints and lines. Each descriptor encodes a gradient magnitude, which is a measure of the change in pixel intensity from one pixel to neighboring pixels in different directions. An exemplary method for encoding the gradient magnitude is described in further detail below in the section entitled "Gradient Encoding over Multiple Scales". This method is also summarized in steps a-d below.

a. A spatial grid over a region of an image is applied at multiple scales. The central region of the square grid is not computed.
b. The mean of the gradient magnitude is computed in each grid space.
c. Pairs of scales are binarized element-wise.
d. Pairs of binarized scales are than subtracted from each other. This yields a ternarized vector $\{-1, 0, 1\}$.

The following section describes how to encode the gradient magnitude for each keypoint.

GEMS: Gradient Encoding Over Multiple Scales

GEMS defines a family of nested feature descriptors that use the gradient-magnitude. The gradient magnitude for a given pixel is the difference in intensity from the pixel to a neighboring pixel. In one embodiment, the gradient magnitude can be computed using the following expression:

$$\nabla f = \frac{\partial f}{\partial x}\hat{x} + \frac{\partial f}{\partial x}\hat{y}$$

where f represents pixel intensity and x and y are pixel coordinates.

Nested descriptors are defined by their pattern and binary structure. Nested descriptors access an image at various octaves and binarize elements against symmetrically placed elements within the structure pattern.

A spatial grid over a region of an image is applied at multiple scales. The mean of the gradient magnitude is computed in each grid space. Pairs of scales are binarized. Pairs of binarized scales are than subtracted from each other. This yields a ternarized vector $\{-1, 0, 1\}$.

Figure 4:
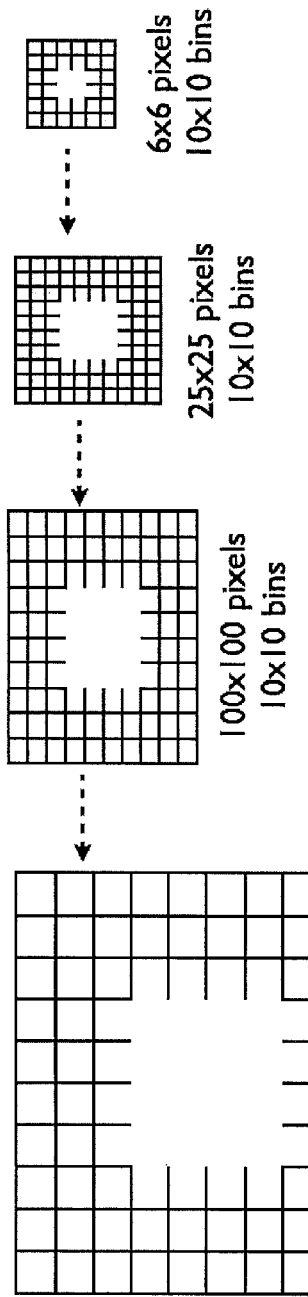
FIG. 4 illustrates the process of forming a GEMS (Gradient Encoding over Multiple Scales) feature descriptor.
Figure 4:
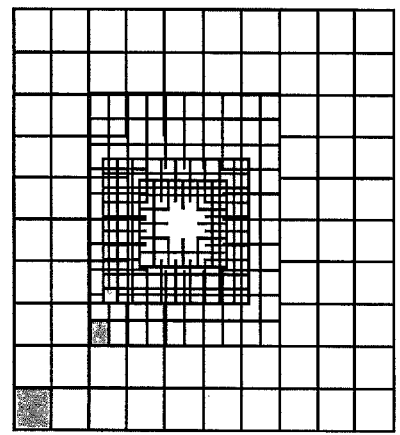

FIG. 4 illustrates a diagram and formula for generating the gradient magnitude for four scales. FIG. 4 illustrates a diagram and formula for generating feature descriptors. In FIG. 4, the top part of the figure includes four grids used to encode the gradient at four different scales. Notice the center regions of the grids are omitted in order to discard less informative regions and achieve a shorter feature length. It should be noted that each grid in FIG. 4 has the same number of grid elements but varying grid element sizes. The bottom left image in FIG. 4 shows the four grids superimposed on top of each other.

The grid structure is composed of adjacent polygons or circles. The grid window as shown in FIG. 4 is a rectangle but may be any symmetrical shape including a circle.

5. Once a gradient descriptor is determined for each keypoint, the descriptors for keypoints in different frames are used to determine a similarity distance between two keypoints in two different frames. In one embodiment, the similarity distance comprises a Hamming distance. An exemplary method for determining the similarity distance and using the similarity distance to identify matching lines and points in different image frames will now be described.

Line Matching and Point Matching

Point Matching

The Hamming distance or an alternate similarity metric may be used to determine the distance between feature descriptors. Hamming distance is the sum of the differences between each element in the vector.

A set of matches is maintained between frame sequences. For instance, the closest matching descriptors to the features in the preceding image are found. After an outlier elimination step (described below) all matching points are kept. This is then repeated for the third frame in each frame triplet. As matched features between triplets are lost, new features are added to the tracking set.

For each triplet, one exemplary method for determining correspondence between frames utilizes a minimum of at least 5 points.

Line Matching

Figure 5:
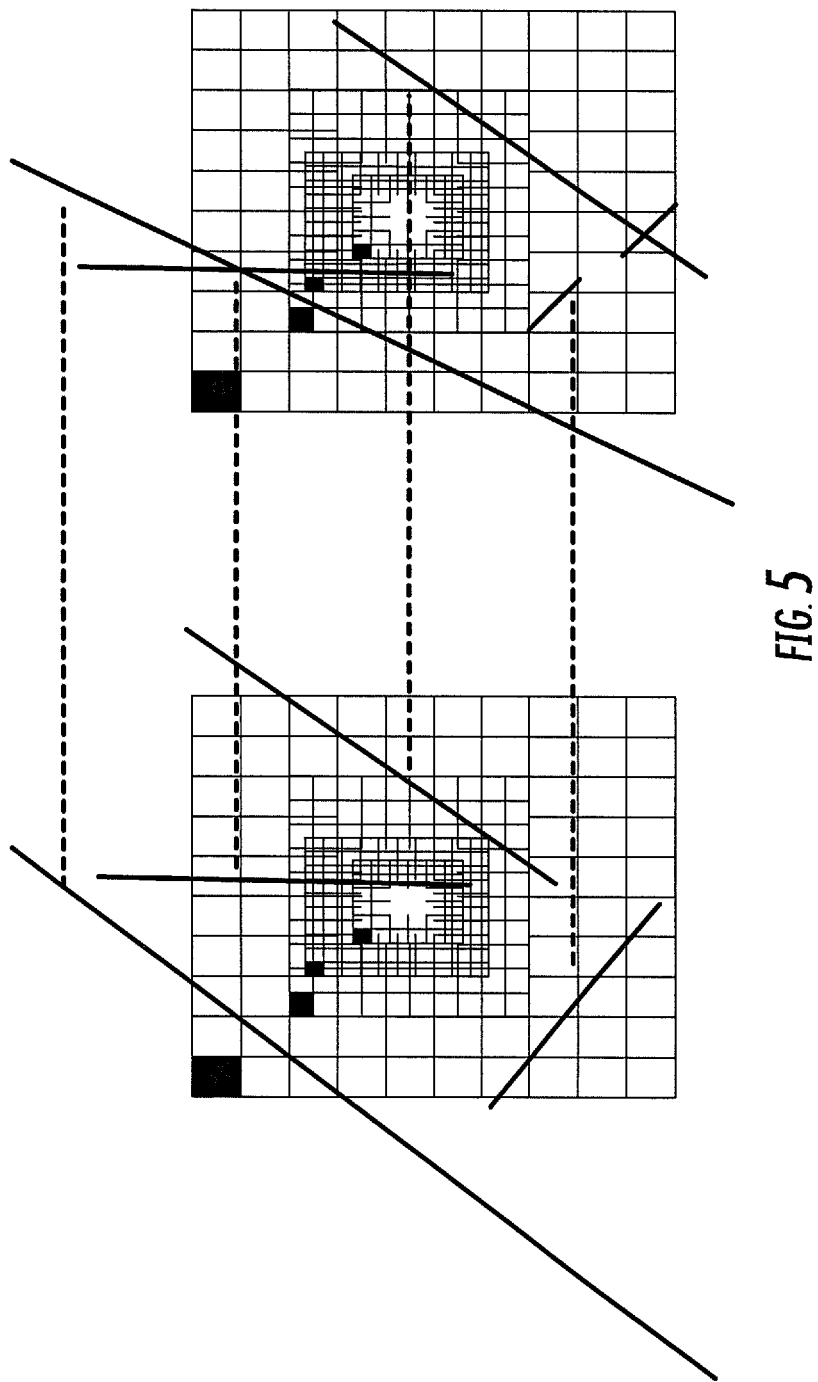
FIG. 5 illustrates an example of line matching between lines associated with the gradients of the GEMS descriptors.

Once the gradients are determined, the gradients may be used to determine line matching between images. FIG. 5 illustrates an example of line matching between lines associated with GEM descriptors. In FIG. 5, the left and right grids represent matching GEMS gradients in two different images.

A line is associated with a GEMS keypoint if any portion of its defining gradient is within the largest scale window. In FIG. 5 the solid diagonal, horizontal, and vertical lines that are within the largest scale grid represent lines whose defining gradient is within the largest scale window. The dashed lines between the grids illustrate corresponding lines identified in the different images.

Three thresholds over line orientation angle are used to categorize the lines into three categories: vertical, horizontal, and diagonal lines. Sets of lines associated with matching GEMS points are matched. Only lines categorized within similar orientations are matched. For vertical and diagonal lines, lines are matched by the order of their midpoints along the horizontal axis. Horizontal lines are matched by the order of their midpoints along the vertical axis. The horizontal and vertical axis is with respect to the camera's optical axis.

The Levenberg-Marquardt algorithm can be applied to match sets of lines within orientation categories instead of matching by the order of their midpoints.

6. Hybrid Tracking of Keypoints, Lines, and Vanishing Points.

Once matching lines and keypoints are identified using the descriptors and the similarity distances, a confidence measure is applied based on pixel blur and drift over the camera path. At the highest confidence, groups of lines associated with matched keypoints can be matched themselves. In the instance where keypoints are identified but there are no associated lines, only the keypoints are matched. Lines, points, and vanishing points can be tracked simultaneously. Alternatively, lines and points may be tracked, and the tracking of vanishing points may only be initialized when the confidence value is low.

a. The classification of the line segments into 3 main groups of projections of parallel lines representing the vertical and the two horizontal directions (like north-south and east-west) in 3D.

b. The estimation of vanishing points from these groups. These vanishing points define a "visual compass".

c. The matching of feature descriptors across three consecutive frames.
    i. Matching occurs between at least one keypoint in each image, if at least three lines fall into the keypoint's window and matches can be found between them.
    ii. Matching occurs between at least three points, if no line matches can be found between the three highest matching points.

d. The matching of line segments associated with the gradients encoded by the feature descriptor across three consecutive frames.
    i. Lines are divided into three categories based on their major angle orientation. In one example, lines may be categorized as follows.
      1. 0-29 degrees: diagonal
      2. 30-59 degrees: horizontal
      3. 60-90 degrees: vertical
    ii. Lines are initially matched by order along the axis.
      1. Vertical and diagonal lines are matched by the associated lines midpoint distance along the horizontal axis.
      2. Horizontal lines and matched by the associated lines midpoints along the vertical axis.
    iii. If order of line segments is not sufficient for a particular frame sequence, Levenberg-Marquardt can be used to match the lines.

Once correspondence between keypoints is identified, outlier keypoints correspondences are filtered based on a heuristic consensus algorithm for matched feature-points between two images. This method is applied across both pairs of images for a three-frame sequence. Structure based outlier elimination will now be explained in more detail.

Structure Based Iterative Outlier Elimination

The structure based iterative outlier elimination process described hereinbelow may be used to eliminate outliers between feature matches in images. It is an alternative to the RANSAC (Random Sample Consensus) approach most popularly used. According to this approach, N matched points in each respective frame are tracked. For all matched points within a frame, the respective distance to all other matched points is computed. This builds a distance curve for each keypoint, where order is determined by the closest matching feature vectors. The compiled keypoint-curves for each image are then matched. After the curve match with the lowest error is found, points with the highest individual error are removed.

Figure 6:
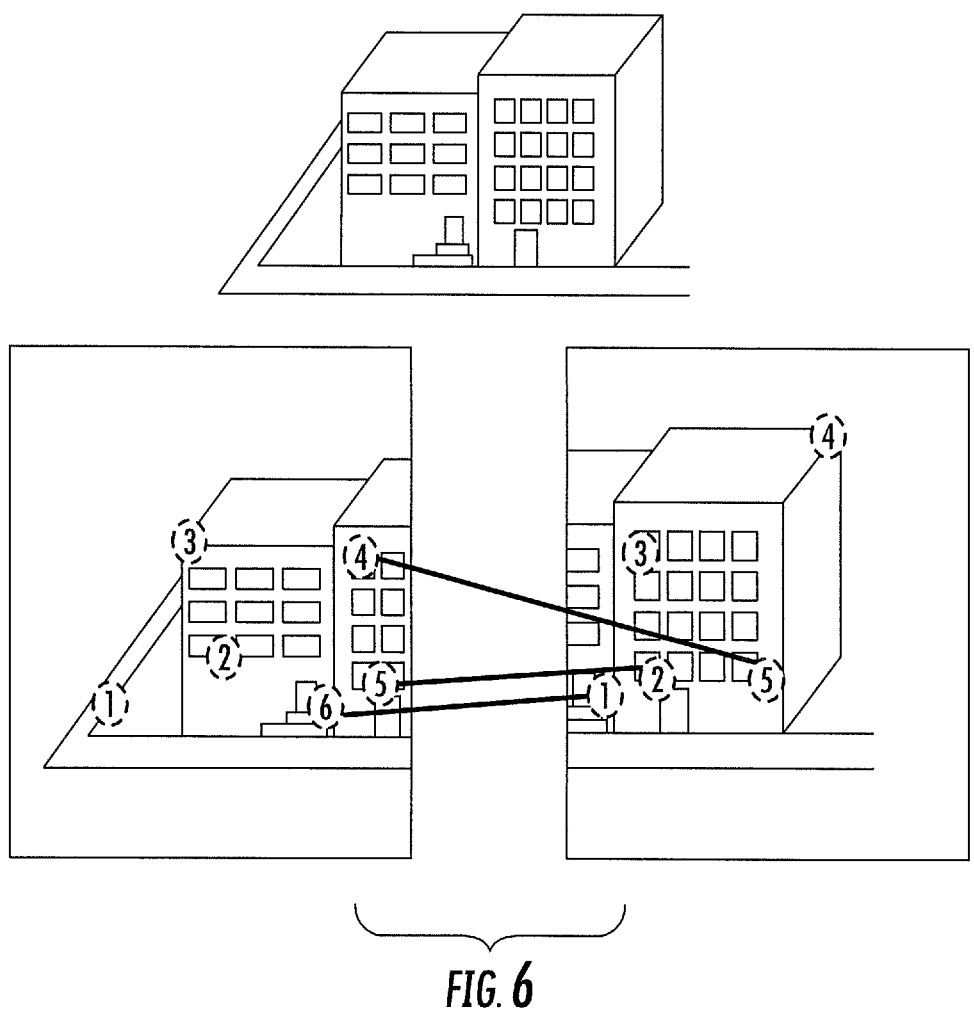
FIG. 6 (top) is a simulation of a real world view of a scene and FIG. 5 (bottom) illustrates captured image frames of the scene, keypoints identified in the image frames, and matches and mismatches between the keypoints.

FIG. 6 (top) is a simulated real world view of two adjacent buildings. The rectangles in the bottom part of FIG. 6 represent successive image frames obtained by a camera whose motion is being tracked. The numbered areas in the frames represent the keypoints that are attempted to be matched between frames. The lines between the keypoints in the different frames represent the keypoints with the highest matching scores. In FIG. 6, there is a mismatch between the keypoint number 4 in the left frame and keypoint number 5 in the right frame. This mismatch should be corrected so that camera motion can be accurately determined.

Figure 7:
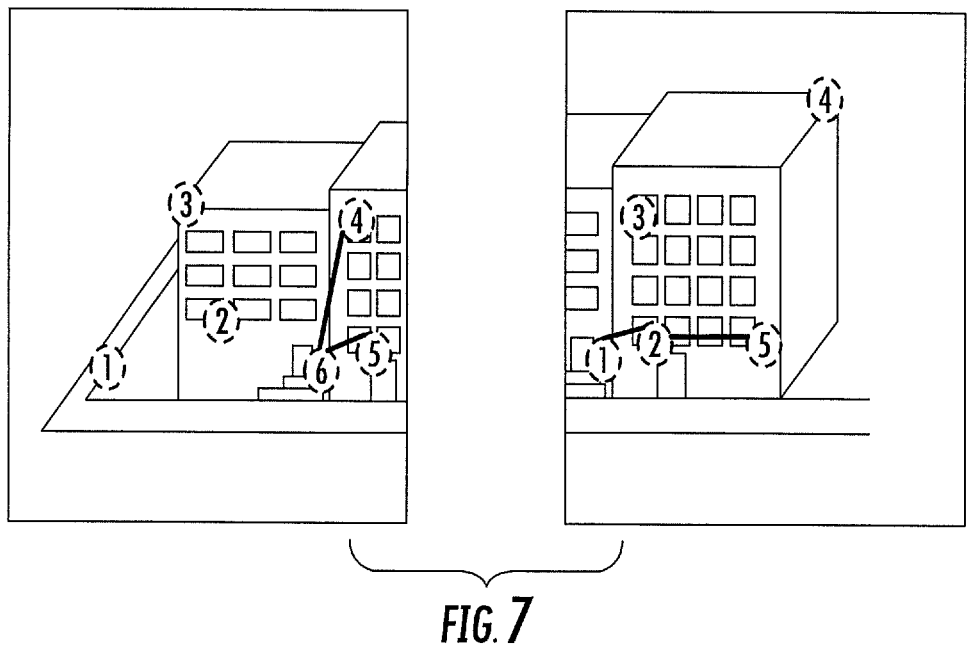
FIG. 7 illustrates the captured image frames from FIG. 5 (bottom) with distances between right-most matched keypoints and other matched keypoints in each image frame.

FIG. 7 shows the relative distance of the right-most matched keypoint to other matched keypoints. In the left hand frame in FIG. 7, the matched keypoints are 4, 5, and 6. The rightmost matched keypoint is keypoint 6. The lines from keypoint 6 to keypoint 4 and from keypoint 6 to keypoint 5 represent the distance from keypoint 6 to the other matched keypoints. Similarly, in the right hand frame, the matched keypoints are 1, 2, and 5. The lines from 5 to 1 and 5 to 2 represent the distance from keypoint 5 to the other matched points.

Figure 8:
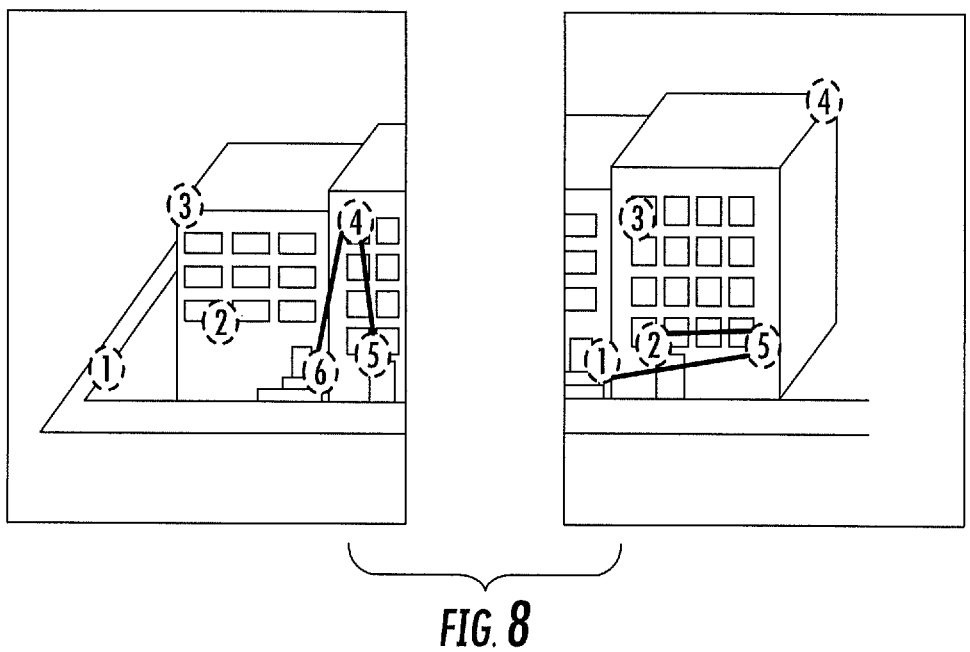
FIG. 8 illustrates the captured image frames from FIG. 5 (bottom) with distances from mismatched keypoints to matched keypoints in each image frame.

FIG. 8 shows the distance of mismatched keypoints to other matched keypoints. In the left-hand frame, the mismatched keypoint is 4, and 5 and 6 are the matched keypoint. Thus, the line from 4 to 5 represents the distance from mismatched keypoint 5 to matched keypoint 4 and the line from 4 to 4 represents the distance from mismatched keypoint 4 to matched keypoint 6.

In the right hand frame in FIG. 8, the matched keypoints are 1 and 2 and the mismatched keypoint is 5. Thus, the lines from 5 to 1 and 5 to 2 represent the distance from the mismatched keypoint to the matched points.

For each matched keypoint the relative distances to other matched keypoints are compiled and ordered by the closest-matching feature descriptors. The curves computed for each image are matched. Iteratively one curve is moved forward and subtracted against the other. The position yielding the least error is found. The points corresponding to sections of the curve with the highest error are omitted from the match model.

Figure 9:
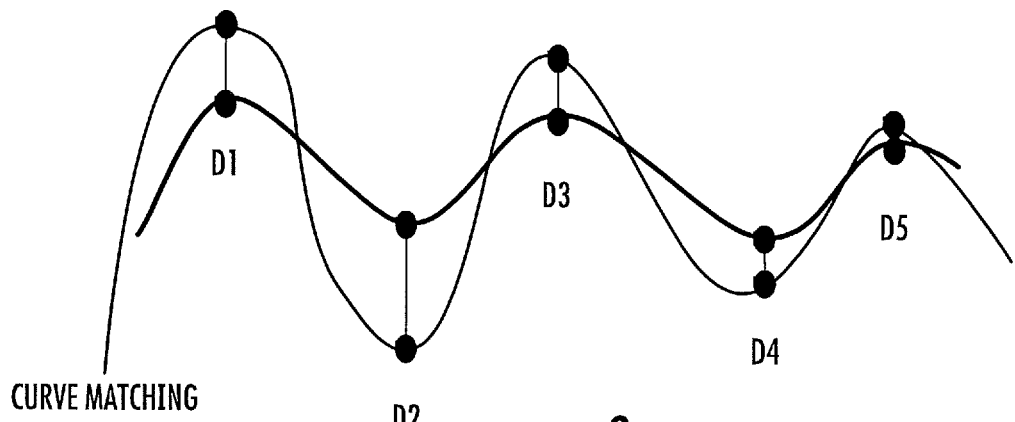
FIG. 9 is point match curve for eliminating outlier matches.

FIG. 9 shows the curves for identifying the outlier match in FIGS. 6-8. In FIG. 9, the distance indicating the largest mismatch between the two curves is D2, which corresponds to the 4-5 mismatch.

The following equation illustrates the structure based iterative outlier elimination algorithm describe above with respect to FIGS. 6-8:

$$\begin{bmatrix} fo & f(i,j) = \sum_{k,l} |p_i - p_k| - |q_j - q_l| \\ & \text{if } |f| > \text{thresh discard } (i,j) \\ & \text{recompute } f \\ & \text{if } f < \text{best}_f \\ end & \text{best}_f = f \end{bmatrix}$$

where, f is the sum of errors between corresponding points $((p_i, q_j))$ in one curve and $(p_k, q_l))$ in the corresponding curve.

Vanishing Points

Figure 10:
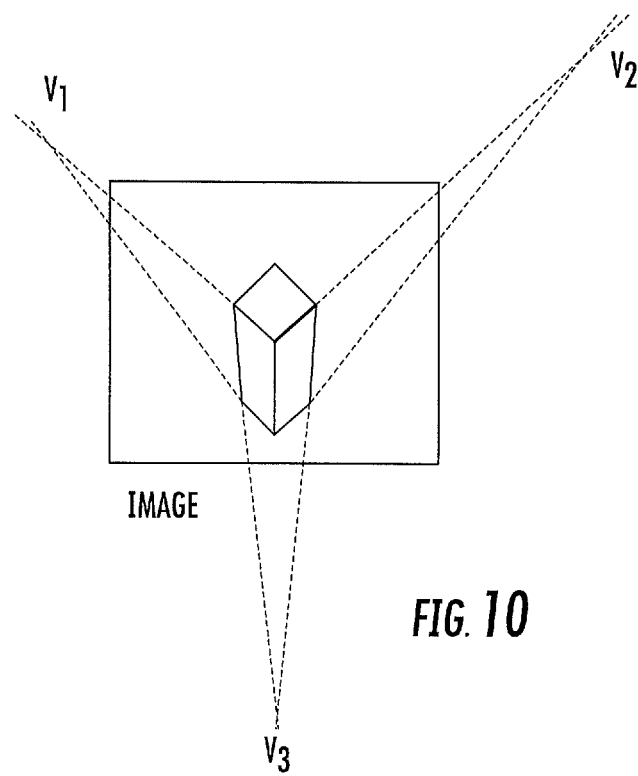
FIG. 10 is a diagram illustrating the primary vanishing points which are found for tracking the rotation of the principal axis of the camera.

Once correspondence between lines is identified and outliers matches are eliminated, vanishing points can be identified from the remaining matching lines in a given frame, and absolute rotation can be computed from the vanishing points. FIG. 10 illustrates the identification of vanishing points in a scene.

If $v_1$, $v_2$, and $v_3$ correspond to the matching vanishing points in each direction, the rotation can be computed as:

$$R = UV^T$$

$$\text{where } \left(\frac{v_1}{\|v_1\|}, \frac{v_2}{\|v_2\|}, \frac{v_3}{\|v_3\|}\right) = USV^T$$

is the singular value decomposition.

If only two vanishing points are found in the scene the cross product of the normalized points can be computed in order to find the rotation matrix as follows:

$$\left(v_1, v_2, \frac{v_1}{\|v_1\|} \times \frac{v_2}{\|v_2\|}\right) = USV^T$$

7. Hybrid Motion Model Computation from Matching with Feature Points, Lines, and Vanishing Points.

Once corresponding features are identified between image frames, the motion of the features can be used to determine camera rotation and movement between frames. The following steps describe the computation of camera rotation and movement between image frames.

a. Compute the absolute rotation based on the identification of principal directions in the scene. These principal directions correspond to vanishing points computed as the intersections of projections of groups of parallel lines in the scene. Two orthogonal groups are sufficient to compute the absolute rotation.
  i. From the absolute position computed at each frame the inter-frame motion is computed.
b. For at least a triplet of frames, (where a triplet is defined as the current image frame and the preceding two frames), estimate inter-frame camera position at every frame based on feature points matched across the triplet.
  i. For a pair of frames three or more points are used to find the essential matrix candidates for feature keypoint matches.
  ii. Triangulate one matching keypoint for each candidate essential matrix. An essential matrix for which points project in front of each camera view is a valid essential matrix. Rotation and translation of the second frame with respect to the previous can be extracted from the essential matrix.
c. From a triplet of frames and line correspondences in those frames, compute a line-based trifocal tensor and the estimation of inter-frame camera position at every frame. (A method for identifying line correspondences between frames is described below in the section entitled "Three Frame Constraints for Line Correspondences". The method is outlined below.
  i. From a triplet of frames and the line-based trifocal tensor the extraction of the two interframe rotations is performed.
  ii. From a triplet of frames and the interframe rotations the computation of the two interframe translations up to one scale factor is performed.
d. In the instance in which points cannot be identified or a motion model (9) from (b-c) yields an improbable motion result, c can be performed and the rotation from the vanishing points is maintained. The average of the previous three frames' translations is used. If there are not three frames, than the number of previous frames up to three frames is used.

The following sections describe line representation and the use of tracked lines in different image frames to determine camera rotation and movement between frames.

Line Representations

Figure 11:
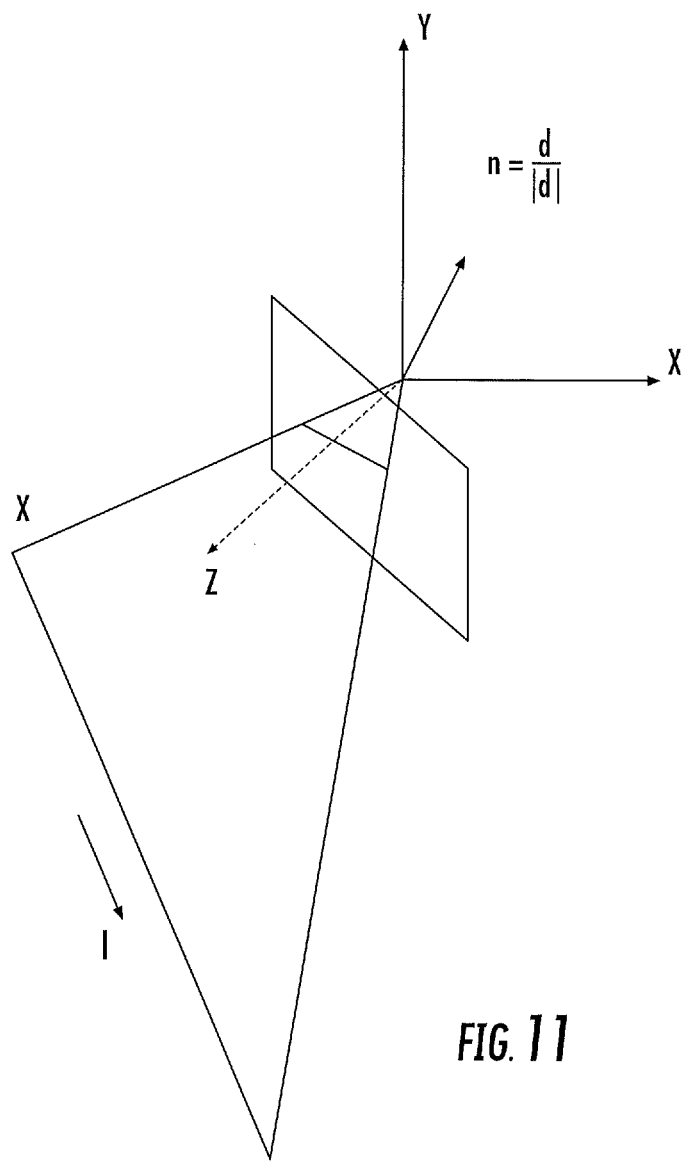
FIG. 11 is a diagram illustrating parameterization of a line according to an embodiment of the subject matter described herein.

In order to determine camera rotation and movement between image frames, line movement and rotation between image frames may be determined. Before movement and rotation can be determined, lines in each image frame must be parameterized. FIG. 11 illustrates exemplary parameterization of a line l. A line 1 in $\mathcal{R}^3$ space can be represented by the unit vector 1 parallel to the line and the momentum (torque) d with respect to the origin. Let X be a keypoint on the line. The moment vector reads then $$d = X \times 1 \quad (1)$$

The Plücker coordinates (1, d) satisfy the constraints $$\|l\| = 1 \text{ and } l^T d = 0 \quad (2)$$

The magnitude of the line momentum d is equal to the distance from the line to the origin.

Three-Frame Constraints for Line Correspondences

Figure 12:
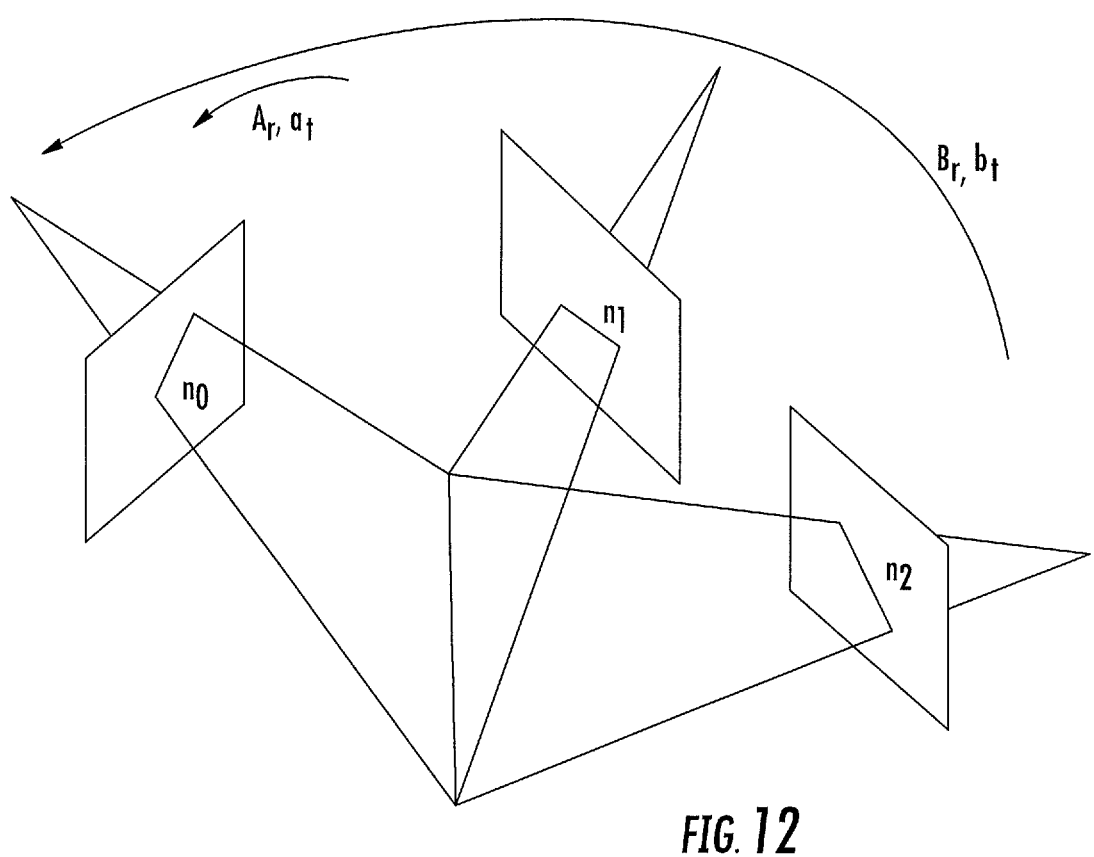
FIG. 12 is a diagram illustrating motion from a line tracked in three frames according to an embodiment of the subject matter described herein.

Let us assume m lines $L_i = 1 \ldots m$ in 3D space captured by a camera in time points $t_0$ and $t_1$ (FIG. 12). Let $l_{ij}$ by the projection of a line in the image. It is geometrically more intuitive instead of $l_{ij}$ to use the viewing plane as measurement spanned by the projection center $O_j$ and the line $l_{ij}$. It can be proven that two frames are insufficient for a 3D interpretation.

We denote that (1, d) the Plücker coordinates of a line $\mathcal{R}^3$. We denote with $n_i$ the normal to the viewing plane $\pi$ at time $t_i$. This normal can be estimated directly from the line equation in the image plane where x and y represent axis in Cartesian coordinates and –a/b is the slope of the line:

$$ax + by + c = 0. \quad (3)$$

and c is the y axis intercept.

We denote with $A_r$ and $B_r$ the rotation from time $t_0$ to time $t_1$ and $t_2$, respectively. We use same subscripts for the translations $a_t$ and $b_t$. FIG. 12 illustrates motion derived from a line tracked in three frames. Plücker coordinates change then as follows:

$$l_1 = A_r l_0 \, d_1 = A_r d_0 + a_t \times A_r l_0 \quad (3.1)$$

$$l_2 = B_r l_0 \, d_2 = B_r d_0 + b_t \times B_r l_0. \quad (3.2)$$

If we eliminate 1 and $\|d\|$ we obtain an equation with the only unknowns being the rotations and translations.

$$A_r^T d_1 = d_0 + A_r^T a_t \times l_0 \quad (4)$$

$$B_r^T d_2 = d_0 + B_r^T b_t \times l_0 \quad (5)$$

taking the vector product from left hand side and the right hand side.

$$A_r^T d_1 \times B_r^T d_2 = d_0 \times (B_r^T b_t \times l_0) + (A_r^T a_t \times l_0) \times d_0 + (A_r^T a_t \times l_0) \times (B_r^T b_t \times l_0). \quad (6)$$

This yields our geometric consistency equation for three frames with line correspondences which contains only rotations $$n_0^T (A_r^T n_1 \times B_r^T n_2) = 0. \quad (7)$$

First we compute the rotation matrices. This can be solved by iterative minimization. Next we are able to find two equations for translations which can be solved as a system of linear equations using the solved rotations from the previous step. To compute the translations, we use the following equations:

$$d_0 \times A_r^T d_1 + d_1^T a_t l_0 = 0 \quad (8)$$

$$d_0 \times B_r^T d_2 + d_2^T b_t l_0 = 0. \quad (9)$$

$$n_2^T b_t (n_0 \times A_r^T n_1) = n_1^T a_t (n_0 \times B_r^T n_2). \quad (10)$$

8. For every new frame, the computation of the absolute rotation using current estimates of lines and points in space derived from the last step is performed. The following steps illustrate an exemplary method for calculating the absolute rotation of the camera.
   a. Update the absolute rotation of the camera based on the product of the current rotation and the inter-frame rotation computed from triplet-frames based on the product of vanishing keypoint rotations.
      i. Step a only needs to be performed if step b yields a confidence below a threshold.
   b. Update the absolute rotation of the camera based on the product of the current rotation and the inter-frame rotation computed from triplet-frames based on keypoint correspondences.
      i. Step b only needs to be performed if step c yields a confidence below a threshold.
   c. Update the absolute rotation of the camera based in the product of the current rotation and the interframe rotation computed from three frames based on line correspondences.
   d. Estimate the absolute rotation of the camera given estimates of current 3D lines positions in space and corresponding matches of 2D lines in images.
   e. Fuse the rotation estimates in steps 8a-d, including a potential estimate read from an Inertial Measurement Unit (IMU) if available. For example, the camera may have an onboard IMU that senses and outputs its own rotation. If an IMU is present, the output from the IMU may be used to verify rotation estimates.
      i. The rotation matrices produced by 8a-d are multiplied by a confidence from their relative covariance matrices and summed.
9. For every new frame, compute the absolute position of the camera using current estimates of lines and points in space. The absolute position of the camera for each new frame may be computed using the following steps:
   a. Estimate absolute position of the camera given estimates of current 3D points in space adjusted with the absolute rotation and corresponding matches of 2D points in images is performed.
   b. Estimate absolute position of the camera given estimates of current 3D lines positions in space adjusted with the absolute rotation and corresponding matches of 2D lines in images is performed.
   c. Fuse the translation estimates in 8a-d adjusted with potential acceleration measurements read from an Inertial Measurement Unit if available is performed.
      i. The rotation matrices produced by 8a-d are multiplied by a confidence from their relative covariance matrices and summed.
10. The global scale of all measurements can be adjusted at a specified frequency as error propagates.
    a. Because of the use of the triplet, absolute scale of current triangulation can be immediately obtained at the next frame using the scale between the previous frame and the current frame. Having triangulations in the same scale an update of the keypoint/line absolute positions as well as an update of the absolute translation and rotation can be obtained at each step using ICL (Iterative Closest Line) or ICP (Iterative Closest Point) over the 3D line segments or points in order to increase accuracy of pose and map estimation.
b. Conventional Bundle Adjustment methods can also be used.

Figure 13:
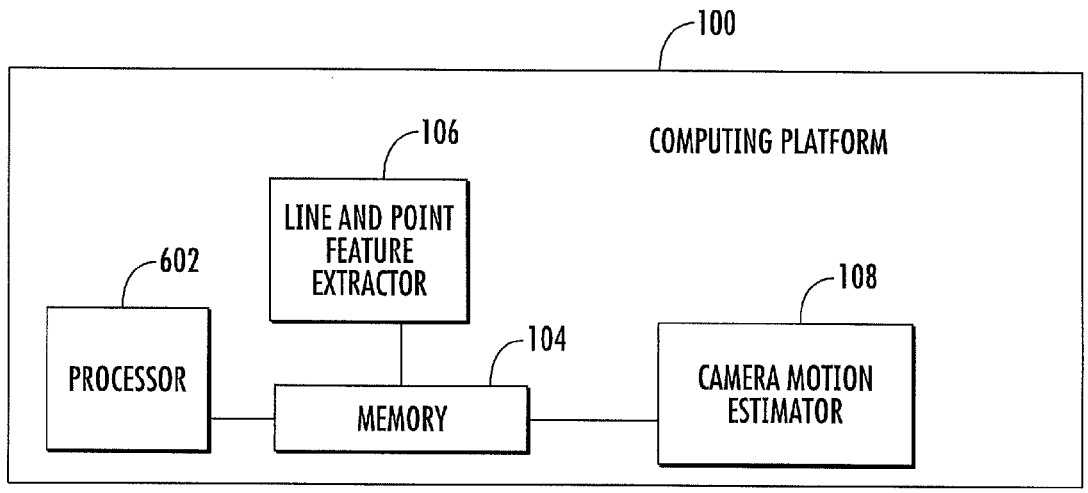
FIG. 13 is a block diagram illustrating an exemplary system for visual odometry using rigid structures identified by antipodal transform according to an embodiment of the subject matter described herein.

FIG. 13 is a block diagram illustrating an exemplary system for visual odometry using rigid structures identified by antipodal transform according to an embodiment of the subject matter described herein.

Referring to FIG. 13, a system for vision supplemented localization may be implemented on a computing platform 100 including a processor 102 and a memory 104. Computing platform 100 may be any suitable computing platform, such as a personal computer, a tablet, a server, or other computing platform including one or more hardware components. In the illustrated example, memory 104 may store instructions that are executed by processor 102 for vision supplemented localization according to embodiments of the subject matter described herein. Accordingly, memory 104 more store a line and keypoint feature extractor 106 that receives as input image frames and extracts line and keypoint features, such as points and line segments from the image frames, using the algorithms described above. Line and keypoint feature extractor 106 may output the extracted line features to camera motion estimator 108. Camera motion estimator 108 may estimate the motion of a camera using the line features and the algorithm described above.

Figure 14:
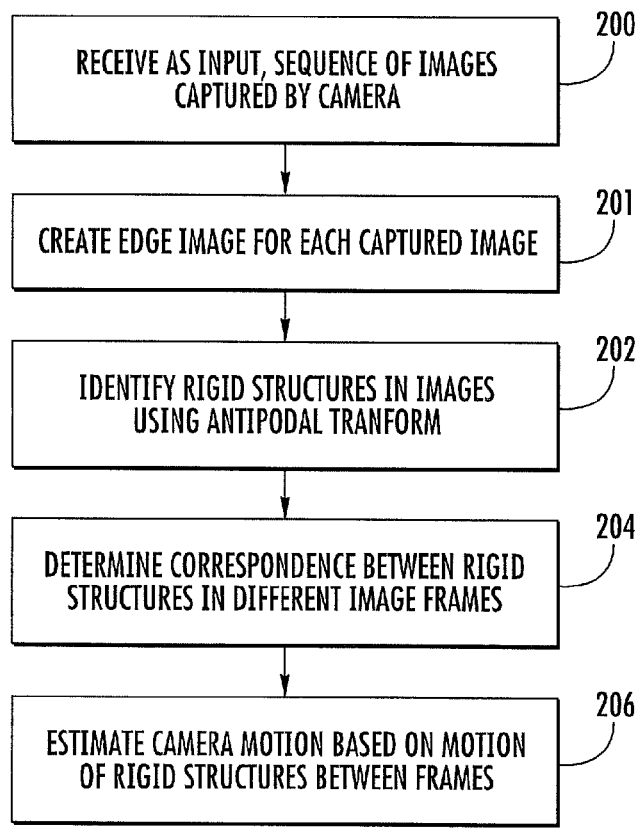
FIG. 14 is a flow chart illustrating an exemplary process for visual odometry using rigid structures identified by antipodal transform according to an embodiment of the subject matter described herein.

FIG. 14 is a flow chart illustrating an exemplary process for visual odometry using rigid structures identified by antipodal transform according to an embodiment of the subject matter described herein. Referring to FIG. 13, in step 200, a sequence of images captured by a camera is received as input. The sequence of images may be any suitable images. In step 201, an edge image is created for each captured image. The edge image may be similar to that illustrated in FIG. 3C. In step 202, rigid structures in the images are identified using an antipodal transform. For example, the antipodal transform may be computed for each edge image pixel, and the computed values may be used to identify edges and midpoints between edges. In step 204, correspondence between rigid structures in different image frames is determined. Descriptors may be defined for each keypoint. Keypoints may be tracked between frames using the descriptors. From the keypoints, lines can be tracked between frames. From the lines that are tracked between frames, camera rotation and change in camera position between frames can be determined. In step 206, a path of motion of the camera is estimated based on motion of the corresponding rigid structures among the different image frames. As stated above, camera rotation and position can be determined based on rotation and position of lines associated with keypoints. Once rotation is determined, absolute position can be determined. Once absolute position is determined in each frame, the change in absolute position of the rigid structures can be used to determined camera motion.

Thus, the subject matter described herein includes improved methods for visual odometry using the antipodal transform. The methods described herein improve the technological field of visual odometry by accurately identify feature correspondence between frames and with less computational resources required by convention methods. The methods described herein improve the functionality of a computer that computes visual odometry correspondences because less computational resources are required than with convention methods. A computer programmed with the visual odometry methods described herein thus constitutes a special purpose processing device with applications to navigation, augmented reality, robotics, and other technological fields where tracking camera motion from video images captured by the camera is desirable.

The documents corresponding to each of the following citations is hereby incorporated herein in its entirety.

CITATIONS

The following citations provided additional detail on the terms in parentheses preceding each citation and which appear in the description hereinabove. (ICL)

Alshawa, Majd. "ICL: Iterative closest line A novel point cloud registration algorithm based on linear features." *Ekscentar* 10 (2007): 53-59. (ICP)

Rusinkiewicz, Szymon, and Marc Levoy. "Efficient variants of the ICP algorithm." 3-*D Digital Imaging and Modeling*, 2001. Proceedings. Third International Conference on. IEEE, 2001. (Levenberg-Marquardt)

Moré, Jorge J. "The Levenberg-Marquardt algorithm: implementation and theory." *Numerical analysis*. Springer Berlin Heidelberg, 1978. 105-116. (Nested Shape Descriptors)

J. Byrne and J. Shi, "Nested Shape Descriptors", International Conference on Computer Vision (ICCV'13), Sydney Australia, 2013. Visual Odometry Nistér, David, Oleg Naroditsky, and James Bergen. "Visual odometry." *Computer Vision and Pattern Recognition*, 2004. CVPR 2004. Proceedings of the 2004 IEEE Computer Society Conference on. Vol. 1. IEEE, 2004. (Distance Transform)

Felzenszwalb, Pedro, and Daniel Huttenlocher. *Distance transforms of sampled functions*. Cornell University, 2004. (Distance Transform)

Ragnemalm, Ingemar. "The Euclidean distance transform in arbitrary dimensions." *Pattern Recognition Letters* 14.11 (1993): 883-888. (Essential Matrix)

Longuet-Higgins, H. Christopher. "A computer algorithm for reconstructing a scene from two projections." *Readings in Computer Vision: Issues, Problems, Principles, and Paradigms*, M A Fischler and O. Firschein, eds (Sep. 10, 1981): 133-135. (Singular Value Decomposition)

Golub, Gene H., and Charles F. Van Loan. Matrix computations. Vol. 3. JHU Press, 2012. (Bundle Adjustment)

Triggs, Bill, et al. "Bundle adjustment—a modern synthesis." *Vision algorithms: theory and practice*. Springer Berlin Heidelberg, 2000. 298-372.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for visual odometry using rigid structures identified by an antipodal transform, the method comprising:
  receiving a sequence of images captured by a camera;
  identifying rigid structures in the images using an antipodal transform;
  identifying correspondence between rigid structures in different image frames; and
  estimating a path of motion of the camera based on motion of corresponding rigid structures among the different image frames;
  wherein identifying rigid structures using the antipodal transform includes:
    generating a binary occupancy matrix for pixels in an image frame, wherein each element in the occupancy matrix indicates whether the pixel includes point on a structure or not;
    linearizing the matrix;

marking occupied elements in the matrix as having a score that is different from unoccupied elements; and for each unoccupied element in the matrix, determining a distance in each of a plurality of directions to the nearest occupied element, computing a score for each distance, and summing the scores for each distance, and identifying the rigid structures using the scores.

2. The method of claim 1 wherein identifying rigid structures using the scores includes identifying unoccupied elements with the highest scores as keypoints that comprise center points of rigid structures.

3. The method of claim 2 wherein identifying correspondence between rigid structures includes generating an image descriptor for each keypoint, the image descriptor including an encoded gradient magnitude, wherein the gradient magnitude represents a change in contrast between image pixels and neighboring image pixels.

4. The method of claim 3 wherein identifying correspondence between rigid structures includes comparing image descriptors in different image frames.

5. The method of claim 4 wherein comparing image descriptors includes utilizing a similarity metric to characterize differences between the image descriptors.

6. The method of claim 5 wherein the similarity metric comprises a Hamming distance.

7. The method of claim 6 wherein comparing the image descriptors includes maintaining sets of closest matching image descriptors among frame triplets after outliner elimination until a predetermined number of matching descriptors is located.

8. The method of claim 1 wherein estimating motion of the camera includes computing absolute rotation of the camera based on identified principal directions in the scene.

9. The method of claim 8 wherein the principal directions are identified using vanishing points computed as intersections of orthogonal groups of parallel lines in the scene.

10. The method of claim 9 comprising computing an absolute position of the camera in each frame.

11. The method of claim 10 wherein estimating motion of the camera includes estimating the motion based on the change in the absolute position of the camera between frames.

12. A system for visual odometry using rigid structures identified by an antipodal transform, the system comprising:
a line and point feature extractor for receiving a sequence of images captured by a camera, identifying rigid structures in the images using an antipodal transform, and identifying correspondence between rigid structures in different image frames; and
a camera motion estimator estimating a path of motion of the camera based on motion of corresponding rigid structures among the different image frames;
wherein the line and point feature extractor is configured to compute the antipodal transform by:
generating a binary occupancy matrix for pixels in an image frame, wherein each element in the occupancy matrix indicates whether the pixel includes point on a structure or not;
linearizing the matrix;
marking occupied elements in the matrix as having a score that is different from unoccupied elements;
for each unoccupied element in the matrix, determining a distance in each of a plurality of directions to the nearest occupied element, computing a score for each distance, and summing the scores for each distance, and identifying the rigid structures using the scores.

13. The system of claim 12 wherein the line and point feature extractor is configured to identify unoccupied elements with the highest scores as keypoints that comprise center points of rigid structures.

14. The system of claim 13 wherein the line and point feature extractor is configured to generate an image descriptor for each keypoint, the image descriptor including an encoded gradient magnitude, wherein the gradient magnitude represents a change in contrast between image pixels and neighboring image pixels.

15. The system of claim 14 wherein the line and point feature extractor is configured to compare image descriptors in different image frames.

16. The system of claim 15 wherein the line and point feature extractor is configured to compare image descriptors utilizing a similarity metric to characterize differences between the image descriptors.

17. The system of claim 16 wherein the similarity metric comprises a Hamming distance.

18. The system of claim 17 wherein the line and point feature extractor is configured to compare descriptors by maintaining sets of closest matching descriptors among frame triplets after outliner elimination until a predetermined number of matching image descriptors is located.

19. The system of claim 12 wherein the motion estimator is configured to estimate motion of the camera includes by computing absolute rotation of the camera based on identified principal directions in the scene.

20. The system of claim 19 wherein the principal directions are identified using vanishing points computed as intersections of orthogonal groups of parallel lines in the scene.

21. The system of claim 20 wherein the motion estimator is configured to compute an absolute position of the camera in each frame.

22. The system of claim 21 wherein the motion estimator is configured to estimate motion of the camera based on the change in the absolute position of the camera between frames.

23. A non-transitory computer readable medium having stored thereon executable instructions that when executed by the processor of a computer control the computer to perform steps comprising:
receiving a sequence of images captured by a camera;
identifying rigid structures in the images using an antipodal transform;
identifying correspondence between rigid structures in different image frames; and
estimating a path of motion of the camera based on motion of corresponding rigid structures among the different image frames;
wherein identifying rigid structures using the antipodal transform includes:
generating a binary occupancy matrix for pixels in an image frame, wherein each element in the occupancy matrix indicates whether the pixel includes point on a structure or not;
linearizing the matrix;
marking occupied elements in the matrix as having a score that is different from unoccupied elements; and
for each unoccupied element in the matrix, determining a distance in each of a plurality of directions to the nearest occupied element, computing a score for each distance, and summing the scores for each distance, and identifying the rigid structures using the scores.

* * * * *